Inventor
Reuben Grubb
by his Attorney
Howson & Howson

UNITED STATES PATENT OFFICE.

REUBEN GRUBB, OF PHILADELPHIA, PENNSYLVANIA.

TIRE.

1,243,513.  Specification of Letters Patent. Patented Oct. 16, 1917.

Application filed May 23, 1916. Serial No. 99,337.

*To all whom it may concern:*

Be it known that I, REUBEN GRUBB, a citizen of the United States, residing in Philadelphia, Pennsylvania, have invented certain Improvements in Tires, of which the following is a specification.

My invention relates to tires for bicycles, automobiles and the like; my improvements having to do more particularly with a tire for automobiles. The object of my invention is to provide a suitable tire that will have the desired or required resiliency, and at the same time is of such construction as to be substantially, if not completely, non-puncturable. To this end I propose to provide a tire shoe of any usual or ordinary construction with a series of hollow rubber balls, with spacing means between the balls which, with said hollow rubber balls, will substantially or completely fill the space within the tire or tire shoe.

In some instances, I may employ a special kind of tire shoe in which recesses may be formed in the inner wall adjacent the tread to receive and space the inserted balls and, in other instances, I may employ a continuous spacer strip, with hollowed portions, for the balls, within the tire shoe and adjacent the tread of the same. In both instances, additional spacing means or members for the balls will be employed adjacent the lugs or flanges of the tire shoe which engage the rim of the wheel, as hereinafter described.

These and other features of my invention are more fully described hereinafter, reference being had to the accompanying drawings, in which.

Figures 1, 2, 3, 4, 5, 6, 7:
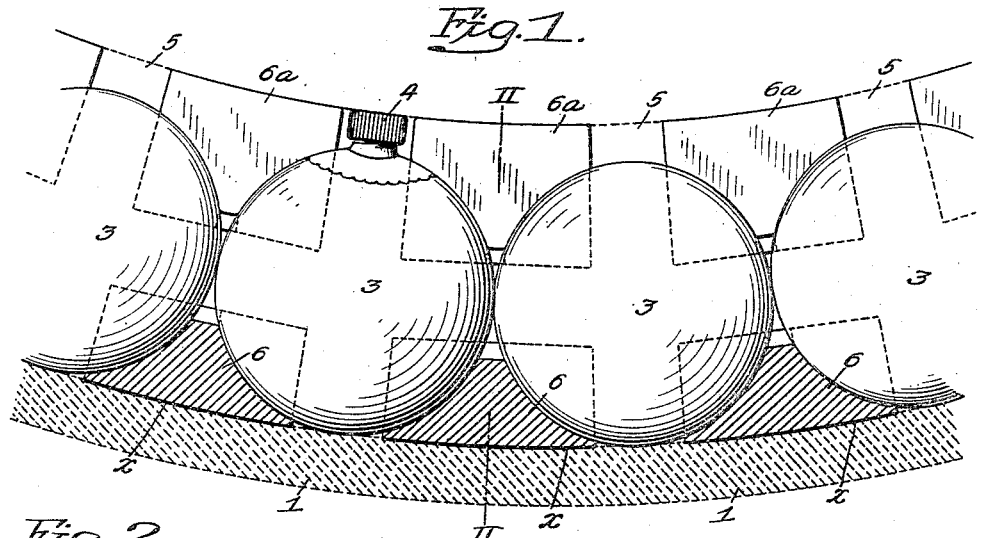
Figure 1, is a sectional elevation of a tire for automobiles embodying my invention; the same being taken on the line I—I, Fig. 2.
Fig. 2, is a cross sectional view on the line II—II, Fig. 1.
Fig. 3, is a similar sectional view of a modified arrangement.
Fig. 4, is a perspective view of the set of filler members shown in Figs. 1 and 2.

Fig. 5, is a cross sectional view illustrating the application of my invention to a tire of another form or shape, showing also modified details of my invention, and Figs. 6 and 7, are views illustrating modified forms of spacing means for the hollow balls within the tire shoe and adjacent the tread of the same for the hollow balls; with which the additional filling or spacing means disposed adjacent the flanges or lugs of the tire may be employed.

The prime requisite of an automobile tire is resiliency. To this end, various forms of pneumatic tires have been proposed and are in use; such tires having material advantages over the ordinary forms of so-called cushion tires, which depend upon the elasticity of their composition, usually rubber, for their resilience. With pneumatic tires, however, the great difficulty is the danger of puncture. Puncture is always annoying, and if it takes place at high speed, the added danger of the automobile swerving from the path and skidding into obstructions or other moving vehicles is always present.

In my improved tire, I provide a shoe 1, which may be of any ordinary or usual type, and it may be carried by a suitable rim 2, of the quick detachable type or otherwise, of any approved style. This shoe is mounted in the usual manner, common to its type, and within the same are disposed a plurality of hollow balls 3 of rubber or rubber composition, or similar, homogeneous, pressure retaining material, preferably, which may or may not be inflated to add to their resiliency, but in any event they are preferably substantially filled with air, although the pressure may be slight.

If desired, any one or a plurality of these balls may be provided with separate nipples 4, as shown in Fig. 1, whereby inflation of the same is possible; such nipples being of any usual character permitting connection with the nozzle of a pump or other structure whereby air may be discharged into the same under pressure, and being equipped with the usual valve or valves (not shown). These balls substantially fill the tire shoe throughout the circumferential area of the same and are preferably in contact with each other throughout the interior of the tire.

In order that the balls may keep their circumferential position with respect to the tire shoe, I provide spacing means disposed between each pair of balls; such spacing means being in the form of blocks or sections of suitable material shaped to conform to the space between the balls; outwardly lying in contact with the inner surface of the tread wall of the tire, while on the inner portion said spacing members substantially conform to the surfaces provided by the flanged portions 5 of the tire shoe.

These sets of spacing members are always in a plurality of sections, and in the present instance, I prefer to employ three sections between each pair of the balls 3; one section 6 being adjacent the tread of the tire, while the other section 6ᵃ, 6ᵃ, are adjacent the lugs or flanges 5 of the same. The several sections are preferably secured to the inner wall of the tire by suitable means, for instance rubber cement, at the points x, although other means of securing the spacing members may be provided if desired. I do not wish to be limited to a construction in which sets of three spacing sections are employed, since I may make use of sets of two spacing sections or members 6 and 6ᵇ, as shown in Fig. 3, or sets of four spacing sections 6ᵃ, 6ᵃ, and 6ᶜ, 6ᶜ, as shown in Fig. 5.

In lieu of a permanent or relatively permanent fastening for certain of the spacing sections to the walls of the tire shoe, those indicated at 6ᵃ for instance, the wall of said tire shoe adjacent the flanges or lugs 5 of the same may be recessed at intervals, as indicated at 7, and the sections 6ᵃ shown in Fig. 5 as disposed therein may be provided with lugs 8 adapted to these recesses whereby said spacing sections or members will be held in relatively fixed position circumferentially of the tire, and movement of said sections circumferentially with respect to the tire will thereby be prevented. In this arrangement, the sections 6ᵃ are otherwise loosely fitted in place so that should it become necessary to replace any of the balls, said sections can be readily removed adjacent the point of renewal and replaced after fresh balls have been fitted. At the same time there will be no danger of the other spacing sections separating from the tire while such repairs are being made.

In Figs. 6 and 7, I have shown other means for positioning or spacing the balls adjacent the tread portion of the tire shoe. Thus in Fig. 6, I have shown a special form of tire having an inner wall or surface provided with rounded recesses 9 for the balls, with positioning portions or spacers 10 between said recesses. In Fig. 7, I have shown a continuous strip 11 disposed internally with respect to the tire shoe adjacent the tread of the same, which strip will have rounded recesses 9ᵃ formed in the inner surface of the same for the balls, with portions 10ᵃ between the recesses for spacing the balls. In both instances the spacing members adjacent the lugs or flanges 5 of the tire may be of a character exactly similar to the spacing members or sections 6ᵃ or 6ᵇ, shown in Figs. 2, 3 and 5. The continuous strip 11 disposed within the tire shoe, as illustrated in Fig. 7, may be fastened to the shoe by suitable means, such as rubber cement, or any suitable mechanical device, so as to prevent movement of the same as well as the balls spaced thereby circumferentially of the tire.

The spacers or spacing members 6, 6ᵃ, 6ᵇ or 6ᶜ, may be made of any suitable material, although I prefer to use an elastic or resilient material, and for this reason I may employ rubber, or a rubber composition. It will be understood, of course, that the spacing members of the several sets will be concaved adjacent the balls to exactly or substantially fit the same, and that the spacing elements or members 6 or 6ᶜ disposed adjacent the tread of the shoe, will be spaced from those indicated at 6ᵃ or 6ᵇ adjacent the flanges or lugs 5 of the shoe, as clearly indicated in the several views of the drawings.

In case an inflatable ball is employed, the nipple for the same may be so arranged as to fit within the recess between sets of spacing members and be thereby held against displacement.

I claim:

1. The combination with a tire shoe, of a plurality of hollow and substantially inflated members within the same and substantially filling the space within the tire shoe, said hollow members lying in contact with the side walls and tread of the tire shoe and with each other, sets of sectional filling or spacing members disposed between said hollow members and the tire shoe; said filling members having rounded recesses forming seats to receive portions of the abutting hollow members and being outwardly shaped to conform to the internal contour of the shoe and having inwardly extending portions for contact with the rim, and means carried by the flanges of the tire for spacing the inwardly projecting portions of the spacing members.

2. The combination with a tire shoe having flanges of a plurality of hollow rubber balls substantially filling the space within the tire shoe, said balls lying in contact with the side walls and tread of the tire shoe and with each other, a plurality of sets of sectional filling or spacing members independent of the tire and disposed between said balls and the tire shoe, portions of said spacers contacting with the tire shoe and other portions with the flanges, said filling members having rounded seats to receive the balls and being outwardly shaped to conform to the internal contour of the shoe and having portions which lie between the flanges of the shoe and contact with the rim, and lugs carried by the flanges and lying between the portions of the spacing members contacting with the rim.

REUBEN GRUBB.

Copies of this patent may be obtained for five cents each, by addressing the "Commissioner of Patents, Washington, D. C."